US011611089B2

United States Patent
Pubrat et al.

(10) Patent No.: US 11,611,089 B2
(45) Date of Patent: Mar. 21, 2023

(54) THERMAL MANAGEMENT SYSTEM AND METHOD OF POSITIONING AND ADJUSTING COOLANT FLOW FOR STATIONARY VEHICLE FUEL CELL APPLICATIONS

(71) Applicant: Hydrogenics Corporation, Mississauga (CA)

(72) Inventors: David Pubrat, Burlington (CA); Tomasz Wajda, Oshawa (CA); Andrew Hill, Scarborough (CA); Predrag Cecaric, Toronto (CA)

(73) Assignee: Hydrogenics Corporation, Mississauga (CA)

( * ) Notice: Subject to any disclaimer, the term of this patent is extended or adjusted under 35 U.S.C. 154(b) by 0 days.

(21) Appl. No.: 17/815,845

(22) Filed: Jul. 28, 2022

(65) Prior Publication Data
US 2023/0044629 A1 Feb. 9, 2023

Related U.S. Application Data

(60) Provisional application No. 63/284,916, filed on Dec. 1, 2021, provisional application No. 63/229,809, filed on Aug. 5, 2021.

(51) Int. Cl.
*H01M 8/04007* (2016.01)
*B60L 58/33* (2019.01)
*H01M 8/04313* (2016.01)
*B60L 50/72* (2019.01)

(52) U.S. Cl.
CPC ......... *H01M 8/04067* (2013.01); *B60L 50/72* (2019.02); *B60L 58/33* (2019.02); *H01M 8/04313* (2013.01); *H01M 2250/20* (2013.01)

(58) Field of Classification Search
CPC ......... H01M 8/04067; H01M 8/04313; H01M 2250/20; B60L 50/72; B60L 58/33
See application file for complete search history.

(56) References Cited

U.S. PATENT DOCUMENTS

| | | | |
|---|---|---|---|
| 2,784,568 | A | 3/1957 | Schjolin |
| 4,582,765 | A | 4/1986 | Kothmann |
| 6,651,761 | B1 | 11/2003 | Hrovat et al. |
| 7,481,288 | B2 | 1/2009 | Makuta et al. |
| 8,785,066 | B2 | 7/2014 | Araki et al. |
| 8,905,123 | B2 | 12/2014 | Miura |
| 9,231,258 | B2 | 1/2016 | Glipa et al. |
| 9,496,735 | B2 | 11/2016 | Sarkar et al. |

(Continued)

FOREIGN PATENT DOCUMENTS

| | | |
|---|---|---|
| CN | 110620247 | 12/2019 |
| CN | 113085591 A * | 7/2021 |

(Continued)

OTHER PUBLICATIONS

Liu, CN 113085591 A; Espacenet machine translation, 2021 (Year: 2021).*

(Continued)

*Primary Examiner* — Adam A Arciero
(74) *Attorney, Agent, or Firm* — Barnes & Thornburg LLP

(57) ABSTRACT

The present disclosure relates to a thermal management system and method of adjusting and/or reversing coolant flow of a fuel cell system during stationary applications.

20 Claims, 11 Drawing Sheets

(56) References Cited

U.S. PATENT DOCUMENTS

| | | | |
|---|---|---|---|
| 9,698,437 | B2 | 7/2017 | Blank et al. |
| 10,522,853 | B2 | 12/2019 | Yamada et al. |
| 2006/0035126 | A1 | 2/2006 | Kurrle et al. |
| 2008/0176122 | A1 | 7/2008 | Wake et al. |
| 2021/0135255 | A1* | 5/2021 | Sawada .................. B60L 50/72 |

FOREIGN PATENT DOCUMENTS

| | | | |
|---|---|---|---|
| DE | 112006000136 | | 11/2007 |
| EP | 2301100 | | 3/2011 |
| JP | 2004259472 | | 9/2004 |
| JP | 2006228631 | | 8/2006 |
| JP | 2016096044 | | 5/2016 |
| JP | 6260516 | | 1/2018 |
| JP | 2019126132 | | 7/2019 |
| JP | 6688826 | | 4/2020 |
| KR | 100778569 | | 11/2007 |
| KR | 1020100025083 | A * | 3/2010 |

OTHER PUBLICATIONS

Kim, KR 1020100025083; Espacenet machine translation, 2010 (Year: 2010).*

* cited by examiner

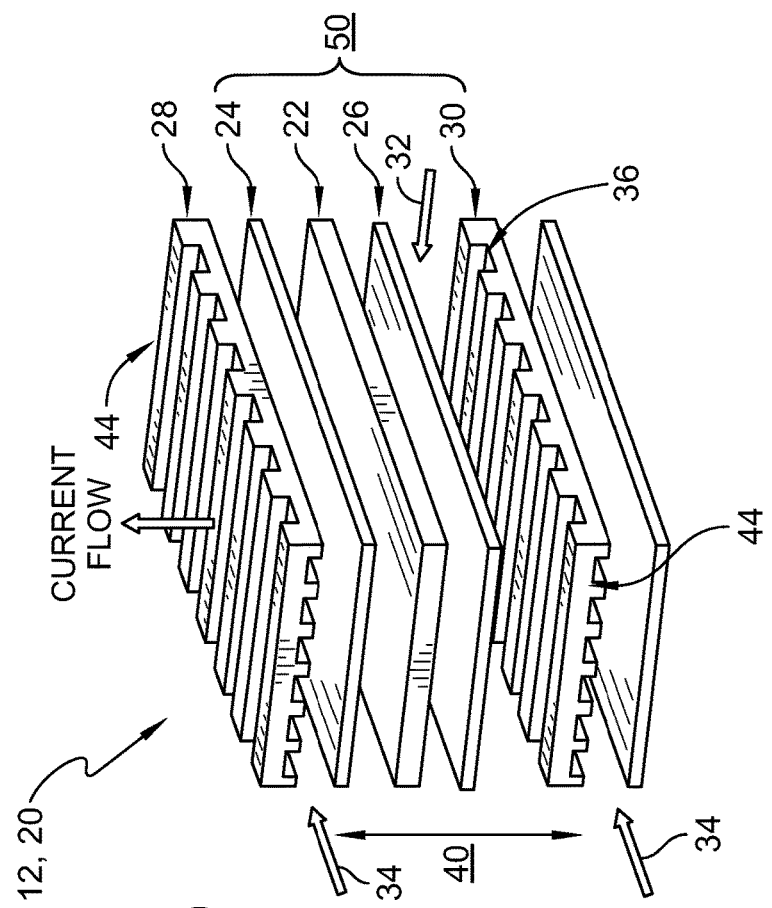
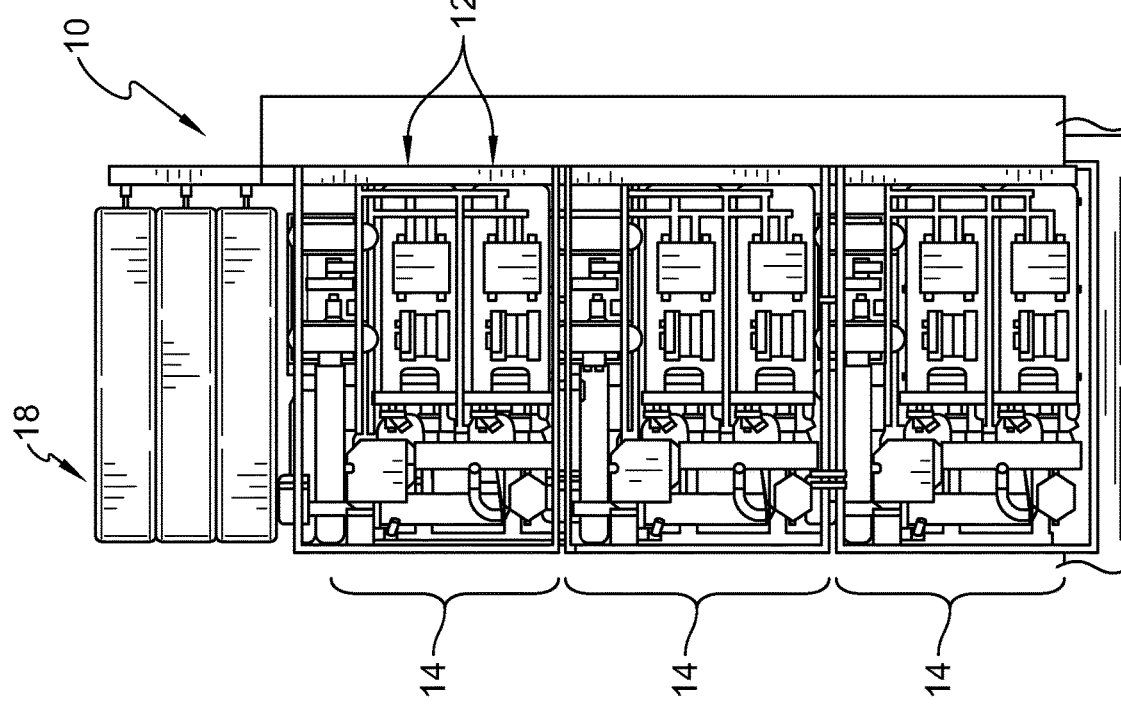
FIG. 1C
FIG. 1B

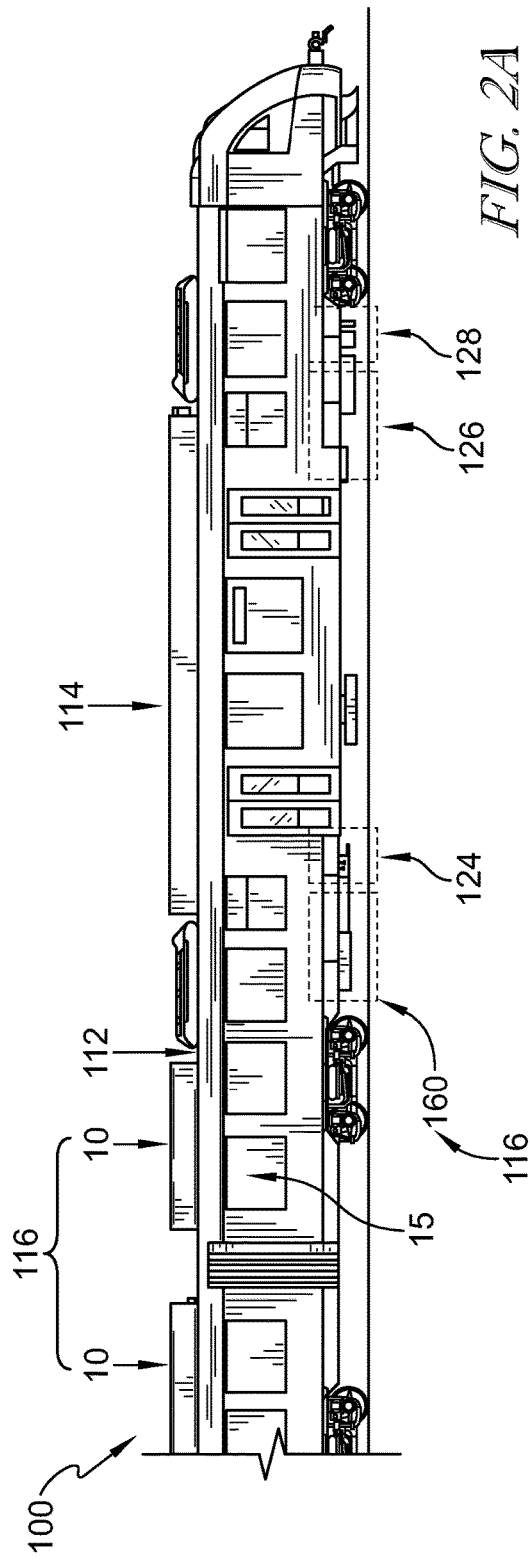
FIG. 2A
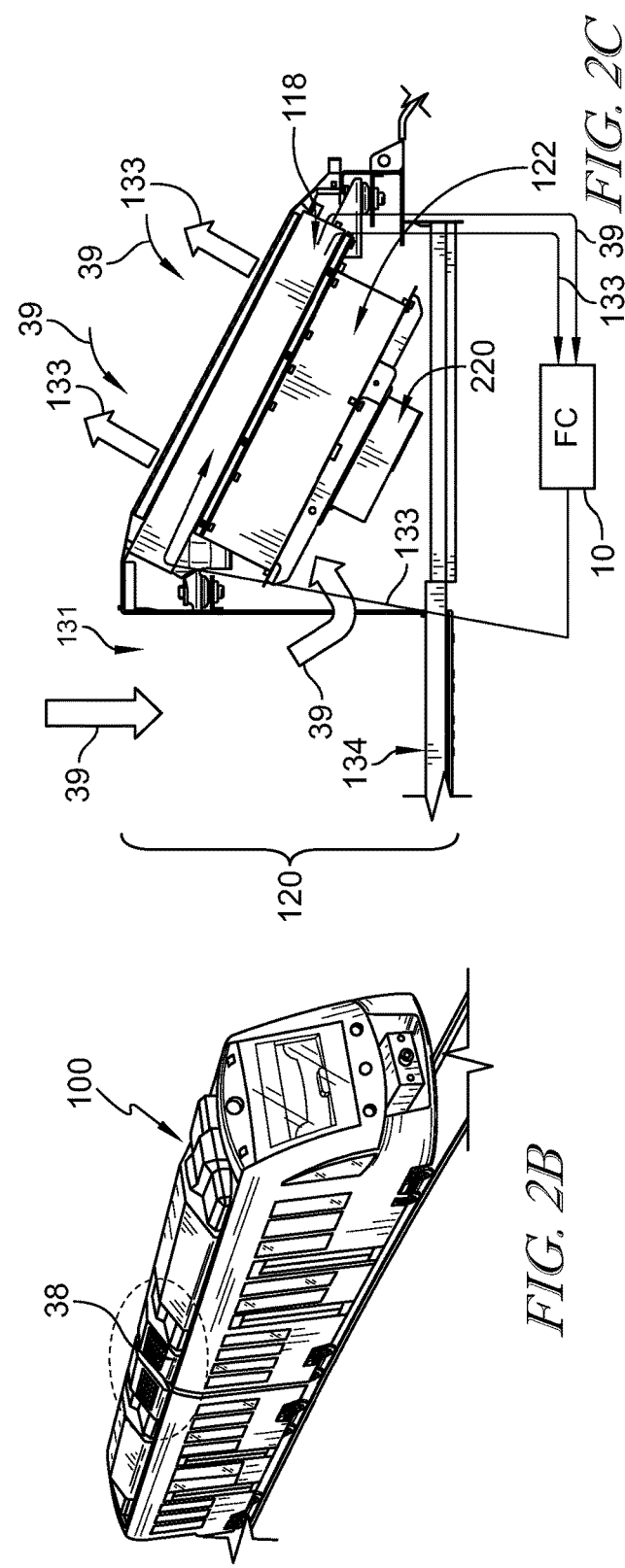
FIG. 2C
FIG. 2B

THERMAL MANAGEMENT SYSTEM AND METHOD OF POSITIONING AND ADJUSTING COOLANT FLOW FOR STATIONARY VEHICLE FUEL CELL APPLICATIONS

CROSS-REFERENCE TO RELATED APPLICATIONS

This nonprovisional application claims the benefit and priority, under 35 U.S.C. § 119(e) and any other applicable laws or statutes, to U.S. Provisional Patent Application Ser. No. 63/229,809 filed on Aug. 5, 2021 and U.S. Provisional Patent Application Ser. No. 63/284,916 filed on Dec. 1, 2021, the entire disclosures of which are hereby expressly incorporated herein by reference.

TECHNICAL FIELD

The present disclosure relates to a thermal management system and method of adjusting and/or reversing coolant flow of a fuel cell system during stationary applications.

BACKGROUND

Fuel cell systems are known for their efficient use of fuel to produce direct current (DC) and/or alternating current (AC) electric energy to power stationary applications (e.g., industrial applications) or mobile applications, such as a vehicle. Fuel cells used in vehicles, such as trains, buses, and trucks, often travel across long distances. Vehicles that travel substantial distances generally will experience starts and stops during a route, such that the vehicle transitions from being a mobile fuel cell application to a stationary fuel cell application.

Existing fuel cell systems typically have radiators that cool hot coolant exiting the fuel cell system. The radiators often comprise radiator fans that exhaust cooling air in a single direction during normal operations of the fuel cells or fuel cell stacks. For example, when the fuel cell is moving or mobile (e.g., on a moving vehicle), the radiator fans exhaust cooling air into the radiator and out into the environment. However, when the fuel cell is stationary (e.g., on a stationary vehicle), the standard radiator or radiator fan is unable to utilize energy provided by environmental factors, such as crosswinds, in order to continue its flow function.

The present disclosure is directed to a thermal management system and method of adjusting the flow of coolants (e.g., fluid, air and/or gases) when a fuel cell system, particularly a mobile fuel cell system, is stationary. The present method and system comprise reversing the direction of the radiator fan when the fuel cell and/or vehicle is stationary in order to maximize the energy utilized from environmental factors, such as wind. This solution permits continuous operation of a radiator fan with reversed air flow through a cooling radiator, which maximizes the efficiency of the thermal management system of the fuel cell system.

SUMMARY

Embodiments of the present disclosure are included to meet these and other needs.

In one aspect of the present disclosure, described herein, a method of operating a thermal management system in a vehicle includes the steps of operating a radiator, one or more fans, and a fuel cell system, slowing or stopping movement of the vehicle to a stationary position, reversing the direction of the one or more fans, drawings crosswinds into the radiator in an opposite direction, and continuing operation of the radiator and the fuel cell system during the stationary position. The radiator and the one or more fans are located on the top surface of the vehicle.

In some embodiments, the radiator, the one or more fans, and the fuel cell system may be located in a frame.

In some embodiments, the stationary position may include a vehicle speed that is at, about, or lower than about 15 km/hour. In some embodiments, the stationary position may include a vehicle speed that is at, about, or lower than about 20 km/hour.

In some embodiments, drawing crosswinds into the radiator in an opposite direction may include drawing ambient air into the radiator first and then through the one or more fans second. In some embodiments, drawing crosswinds into the radiator in an opposite direction may include drawing ambient air into the one or more fans first and then through the radiator second.

In some embodiments, the step of operating may further include operating a second radiator, the second radiator being coupled to one or more fans. In some embodiments, drawing crosswinds into the radiator in an opposite direction may include drawing ambient air into the radiator first, through the one or more fans second, through the one or more fans coupled to the second radiator third, and through the second radiator last.

In a second aspect of the present disclosure, a thermal management system for optimally cooling air in a stationary vehicle includes one or more adjusted fans, one or more radiators comprising crosswinds, and a frame. The adjusted fan directs air into one or more radiators in a direction opposite a normal fan. The frame positions the one or more radiators on the top-side of the stationary vehicle. The system may be an apparatus or embodied within an apparatus.

In some embodiments, the stationary vehicle may travel at a vehicle speed that is at, about, or lower than about 20 km/hour.

In some embodiments, the one or more radiators, the one or more adjusted fans, and the fuel cell system may be separately located on the top surface of the stationary vehicle. In some embodiments, the one or more radiators and the one or more adjusted fans may be positioned adjacent to the fuel cell system by at least 0.5 inches of a separation distance. In some embodiments, the separation distance may range from about 0.5 inches to about 12 inches.

In a third aspect of the present disclosure, a method of exhausting air of a thermal management system on a stationary train includes the steps of operating at least two radiators, at least two fans, and a fuel cell system, slowing or stopping movement of the stationary train to a stationary position that comprises a speed that is about or less than 20 km/hour, drawing air flow and crosswinds into at least one of the at least two radiators in an opposite direction of a normal fan, propelling the air flow and the crosswinds through at least one of the at least two radiators, and exhausting air out of at least one of the at least two radiators and the fuel cell system while the stationary train is in the stationary position.

In some embodiments, the at least two radiators, the at least two fans, and the fuel cell system may be located in a frame.

In some embodiments, the stationary position may include speed that is at, about, or lower than about 15 km/hour.

In some embodiments, the at least two radiators, the at least two fans, and the fuel cell system may be located on the top surface of the stationary train. In some embodiments, the at least two radiators, the at least two fans, and the fuel cell system may be separately located on the top surface of the stationary train. In some embodiments, the at least two radiators and the at least two fans may be positioned adjacent to the fuel cell system by at least 0.5 inches of a separation distance. In some embodiments, the separation distance may range from about 0.5 inches to about 12 inches.

BRIEF DESCRIPTION OF THE DRAWINGS

FIG. 1B is an illustration of a fuel cell system having fuel cell modules, each fuel cell module having fuel cell stacks and/or fuel cells.

FIG. 1C is an illustration of components of a fuel cell in the fuel cell stack.

FIG. 2A is a schematic of one vehicle embodiment (e.g., a train) showing fuel cells, fuel tanks, and radiators located on a top surface of the train.

FIG. 2B is an image showing fuel cells, fuel tanks, and radiators located on the top surface of a train.

FIG. 2C is a schematic showing fuel tanks and radiators located on the top surface of a train in relation to fuel cells located in the train coach.

Figure 1A:
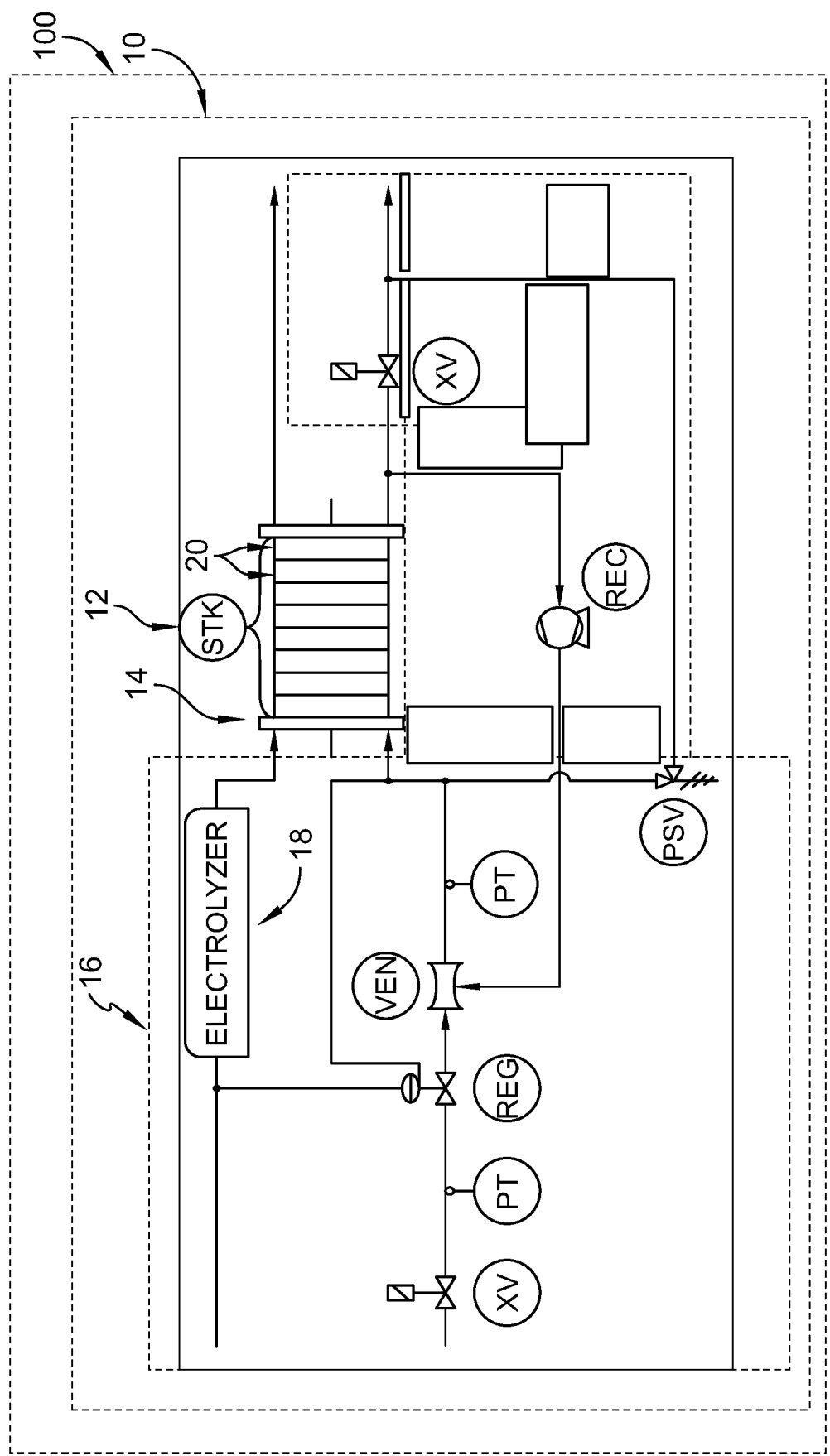
FIG. 1A is an illustration of a fuel cell system including one or more fuel cell stacks connected to a balance of plant.

These and other features, aspects, and advantages of the present invention will become better understood when the following detailed description is read with reference to the accompanying drawings described herein. Reference is also made to the accompanying drawings that form a part of the present disclosure and show, by way of illustration of specific embodiments, in which ways the invention may be practiced. These embodiments are described in sufficient detail to enable those skilled in the art to practice what is claimed and are not limiting. Instead, it is to be understood that other embodiments may be utilized and that logical mechanical and electrical changes may be made without departing from the spirit and scope of the invention and/or claims.

DETAILED DESCRIPTION

The present disclosure is related to a thermal management system 120 and method for adjusting the coolant 36 flow of a fuel cell system 10. Adjusting the coolant 36 flow comprises changing, advancing, stopping, reversing, modifying, and/or impacting the flow of a coolant 36 through a fuel cell system 10. A reactant 32, 34 of the fuel cell system 10 includes, but is not limited to a fuel 32 and an oxidant 34 (e.g., air or oxygen).

As shown in FIG. 1A, fuel cell systems 10 often include one or more fuel cell stacks 12 or fuel cell modules 14 connected to a balance of plant (BOP) 16, including various components, to create, generate, and/or distribute electrical power for meet modern day industrial and commercial needs in an environmentally friendly way. As shown in FIGS. 1B and 1C, fuel cell systems 10 may include fuel cell stacks 12 comprising a plurality of individual fuel cells 20. Each fuel cell stack 12 may house a plurality of fuel cells 20 connected together in series and/or in parallel. The fuel cell system 10 may include one or more fuel cell modules 14 as shown in FIGS. 1A and 1B.

Each fuel cell module 14 may include a plurality of fuel cell stacks 12 and/or a plurality of fuel cells 20. The fuel cell module 14 may also include a suitable combination of associated structural elements, mechanical systems, hardware, firmware, and/or software that is employed to support the function and operation of the fuel cell module 14. Such items include, without limitation, piping, sensors, regulators, current collectors, seals and insulators.

The fuel cells 20 in the fuel cell stacks 12 may be stacked together to multiply and increase the voltage output of a single fuel cell stack 12. The number of fuel cell stacks 12 in a fuel cell system 10 can vary depending on the amount of power required to operate the fuel cell system 10 and meet the power need of any load. The number of fuel cells 20 in a fuel cell stack 12 can vary depending on the amount of power required to operate the fuel cell system 10 including the fuel cell stacks 12.

The number of fuel cells 20 in each fuel cell stack 12 or fuel cell system 10 can be any number. For example, the number of fuel cells 20 in each fuel cell stack 12 may range from about 100 fuel cells to about 1000 fuel cells, including any specific number or range of number of fuel cells 20 comprised therein (e.g., about 200 to about 800). In an embodiment, the fuel cell system 10 may include about 20 to about 1000 fuel cells stacks 12, including any specific number or range of number of fuel cell stacks 12 comprised therein (e.g., about 200 to about 800). The fuel cells 20 in the fuel cell stacks 12 within the fuel cell module 14 may be oriented in any direction to optimize the operational efficiency and functionality of the fuel cell system 10.

The fuel cells 20 in the fuel cell stacks 12 may be any type of fuel cell 20. The fuel cell 20 may be a polymer electrolyte membrane or proton exchange membrane (PEM) fuel cell, an anion exchange membrane fuel cell (AEMFC), an alkaline fuel cell (AFC), a molten carbonate fuel cell (MCFC), a direct methanol fuel cell (DMFC), a regenerative fuel cell (RFC), a phosphoric acid fuel cell (PAFC), or a solid oxide fuel cell (SOFC). In an exemplary embodiment, the fuel cells 20 may be a polymer electrolyte membrane or proton exchange membrane (PEM) fuel cell or a solid oxide fuel cell (SOFC).

In an embodiment shown in FIG. 1C, the fuel cell stack 12 includes a plurality of proton exchange membrane (PEM) fuel cells 20. Each fuel cell 20 includes a single membrane electrode assembly (MEA) 22 and a gas diffusion layer (GDL) 24, 26 on either or both sides of the membrane electrode assembly (MEA) 22 (see FIG. 1C). The fuel cell 20 further includes a bipolar plate (BPP) 28, 30 on the external side of each gas diffusion layers (GDL) 24, 26. The above mentioned components, 22, 24, 26, 30 comprise a single repeating unit 50.

The bipolar plates (BPP) 28, 30 are responsible for the transport of reactants, such as fuel 32 (e.g., hydrogen) or oxidant 34 (e.g., oxygen, air), and cooling fluid 36 (e.g., coolant and/or water) in a fuel cell 20. The bipolar plate (BPP) 28, 30 can uniformly distribute reactants 32, 34 to an active area 40 of each fuel cell 20 through oxidant flow fields 42 and/or fuel flow fields 44. The active area 40, where the electrochemical reactions occur to generate electrical power produced by the fuel cell 20, is centered within the gas diffusion layer (GDL) 24, 26 and the bipolar plate (BPP) 28, 30 at the membrane electrode assembly (MEA) 22. The bipolar plate (BPP) 28, 30 are compressed together to isolate and/or seal one or more reactants 32 within their respective pathways, channels, and/or flow fields 42, 44 to maintain electrical conductivity, which is required for robust during fuel cell 20 operation.

The fuel cell system 10 described herein, may be used in stationary and/or immovable power system, such as industrial applications and power generation plants. The fuel cell system 10 may also be implemented in conjunction with electrolyzers 18 and/or other electrolysis system 18. In one embodiment, the fuel cell system 10 is connected and/or attached in series or parallel to an electrolysis system 18, such as one or more electrolyzers 18 in the BOP 16 (see FIG. 1A). In another embodiment, the fuel cell system 10 is not connected and/or attached in series or parallel to an electrolysis system 18, such as one or more electrolyzers 18 in the BOP 16.

The present fuel cell system 10 may also be comprised in mobile applications. In an exemplary embodiment, the fuel cell system 10 is in a vehicle and/or a powertrain 100. A vehicle 100 comprising the present fuel cell system 10 may be an automobile, a pass car, a bus, a truck, a train, a locomotive, an aircraft, a light duty vehicle, a medium duty vehicle, or a heavy duty vehicle.

The vehicle and/or a powertrain 100 may be used on roadways, highways, railways, airways, and/or waterways. The vehicle 100 may be used in applications including but not limited to off highway transit, bobtails, and/or mining equipment. For example, an exemplary embodiment of mining equipment vehicle 100 is a mining truck or a mine haul truck.

Referring to FIGS. 2A and 2B, a powertrain or vehicle 100 is illustratively embodied as a train 100. The train 100 is shown to have a top external surface 112 that is above an inner region 15 (e.g., above the train coach). Fuel cell systems 10 and fuel tanks 114 comprising fuel 32 may be mounted, positioned, and/or located on either or both of the top external surface 112 and the inner region 15, as shown in FIGS. 2A and 2B. In some embodiments, the fuel cell systems 10 and fuel tanks 114 are only mounted, positioned, and/or located on the top external surface 112 of the vehicle 100.

Fuel tanks 114 are typically connected to one or more power sources 116. In one embodiment, a powertrain or vehicle 100 may be powered by one or more, and typically more than one, of any type of a power source 116. A power source 116 of the present method or system may include but is not limited to an engine (e.g., an internal combustion engine (ICE), a diesel engine, a hydrogen powered engine, etc.) (not shown), a fuel cell system 10, and/or a battery system 160. A typical hybrid powertrain or vehicle 100 may comprise at least two different types of power sources 116 (e.g., an engine, a fuel cell system 10, a battery system 160, etc.).

In an illustrative embodiment, a hybrid powertrain or vehicle 100 may comprise a fuel cell system 10 and a battery system 160. An exemplary battery system 160 is a high powered battery system having an energy capacity ranging from about 80 kWh to 150 kWh. An exemplary powertrain or vehicle 100 may include at least one fuel cell system 10 and at least one high voltage battery system 160, as shown in FIG. 2A. In a further embodiment, the powertrain or vehicle 100 may comprise additional power sources 116, such as a diesel engine and/or a hydrogen powered engine (not shown), in addition to the fuel cell system 10 and/or the high voltage battery system 160.

In one embodiment, the powertrain or vehicle 100 may comprise one fuel cell system 10. In other embodiment, such as shown in FIG. 2A, the powertrain or vehicle 100 may comprise more than one fuel cell system 10. In some embodiments, the fuel cell system 10 may comprise about 2 to 20 fuel cell systems 10, including any specific number or range comprised therein. Some embodiments of the powertrain or vehicle 100 may comprise about 2 to 3 fuel cell systems 10, about 4 to 8 fuel cell systems 10, or about 8 to 10 fuel cell systems 10.

In one embodiment, the powertrain or vehicle 100 may comprise one or more battery systems 160 (e.g., a high voltage battery system 160). In one embodiment, the powertrain or vehicle 100 may comprise about 1 to 10 battery systems 160, including any number or range comprised therein (e.g., 1, 2, 3, 4, 5, etc.), such as is shown in FIG. 2A. In one illustrative embodiment, the powertrain or vehicle 100 may comprise only one high voltage battery system 160. In another illustrative embodiment, the powertrain or vehicle 100 may comprise more than one high voltage battery system 160.

In some embodiments, the powertrain or vehicle 100 may comprise additional components. In some embodiments, the powertrain or vehicle 100 may comprise a converter 124, 126. For example, the powertrain or vehicle 100 may comprise an auxiliary converter 124 or a traction converter 126. In other embodiments, the powertrain or vehicle 100 may comprise a motor 128 (e.g., a traction motor 128).

Figure 3A:
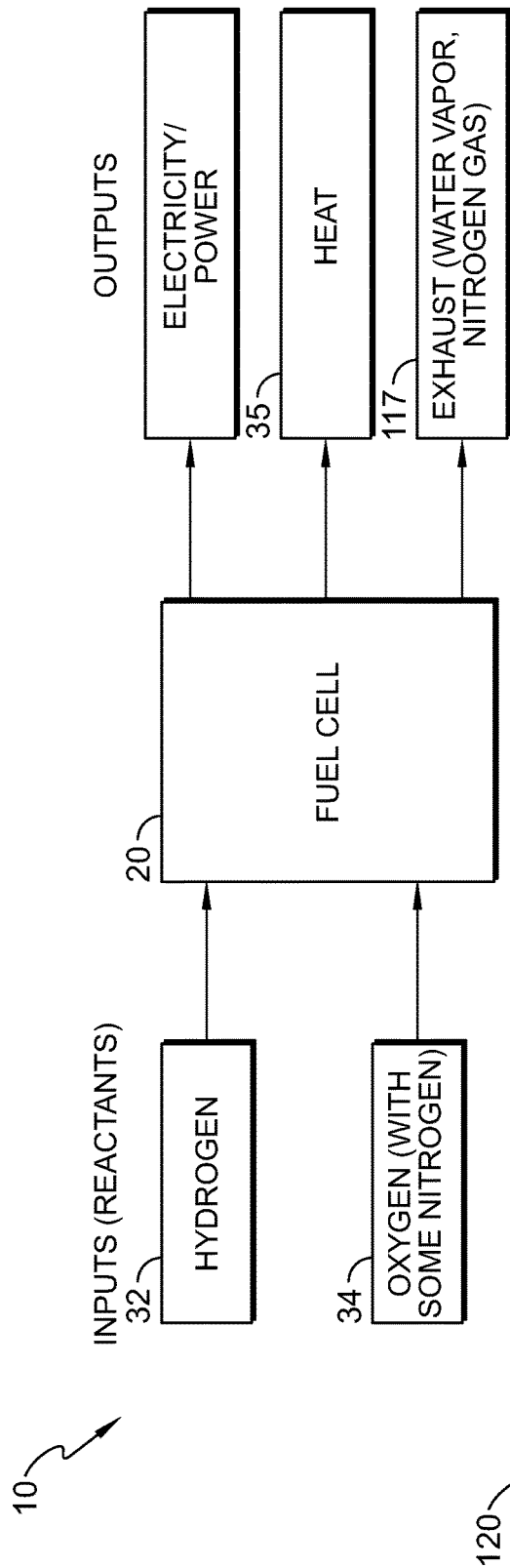
FIG. 3A is a schematic showing an embodiment of a fuel cell power generation system comprising a fuel cell system.
Figure 3B:
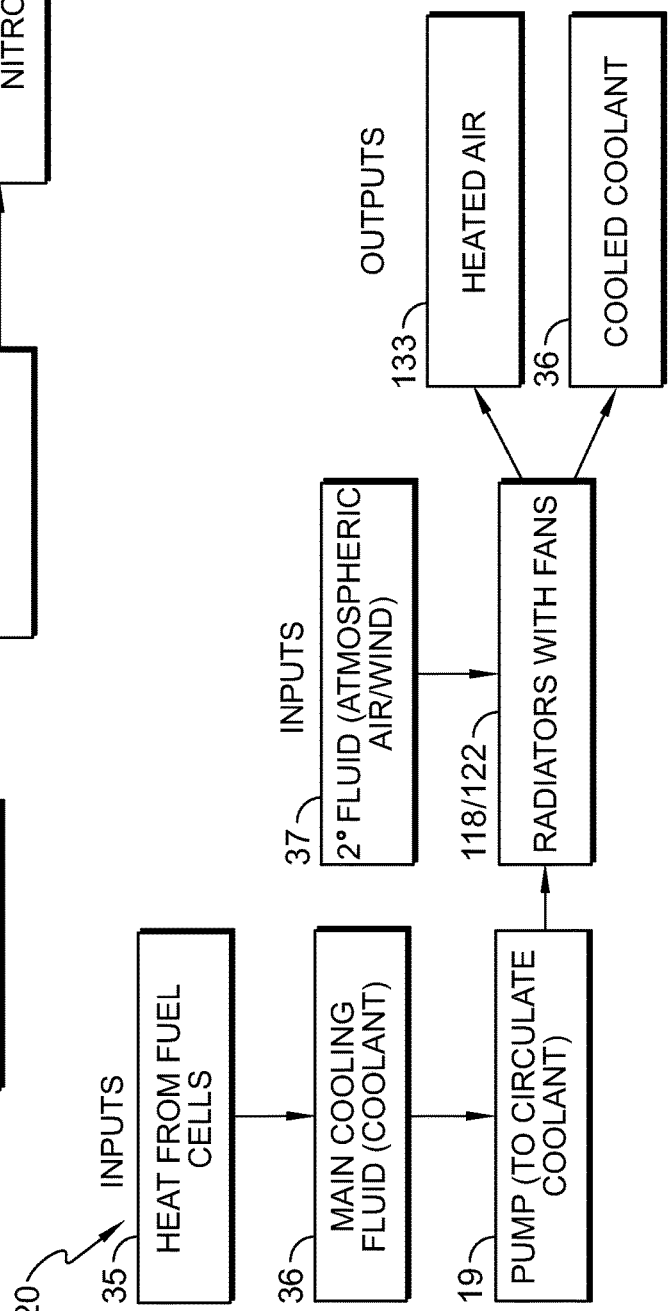
FIG. 3B is a schematic showing an embodiment of a thermal management system comprising radiators with fans.

Referring to FIGS. 3A and 3B, in addition to the fuel cell system 10, the battery system 160, and any additional components, the powertrain or vehicle 100 may further comprise a thermal management system 120. The thermal management system 120 of the present disclosure manages the heat 35, air 39, and/or gases produced by a fuel cell system 10 in order to remove heat 35 and cool the fuel cell system 10 efficiently and effectively in order to maintain acceptable operating temperatures. The thermal management system 120 may automatically, electronically, manually measure, sample, or otherwise control and manage heat 35 dissipated by a radiator 118 and/or exhaust 117.

As shown in FIGS. 3B-8, a thermal management system 120 of the powertrain or vehicle 100 comprises, is configured to be connected to, or configured to communicate with one or more fuel cell systems 10, one or more radiators 118, a pump 19, a motor 220, one or more radiator fans 122, and/or an exhaust system 117, either individually or in combination with each other. In an exemplary embodiment, the thermal management system 120 comprises at least two radiators 118 for each fuel cell system 10. Further, the thermal management system 120 may also comprise one or more external coolant flow passages, ports, nozzles, misters, sensors, and/or other components to provide sufficient heat 35, air 39, or coolant 36 dissipation in order to keep the fuel cell system 10 within desired operating temperature specifications.

Figure 4:
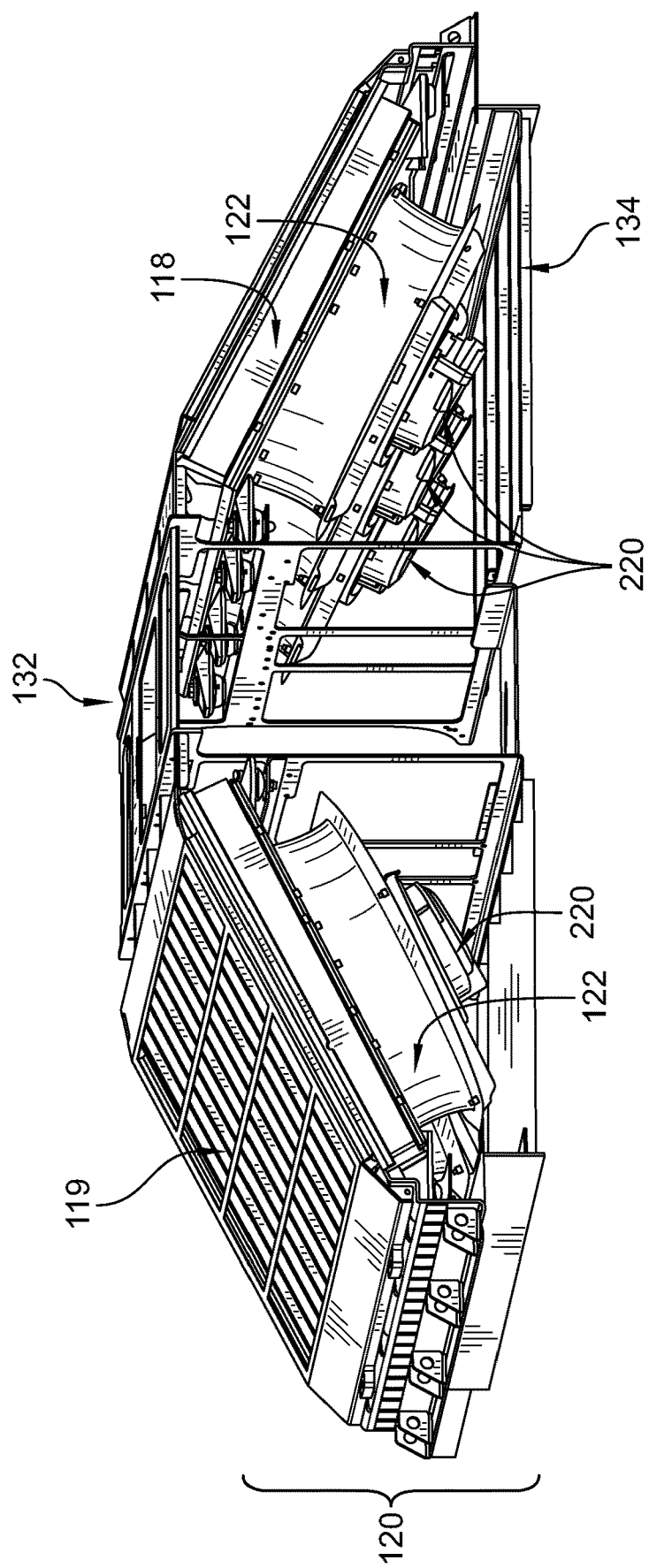
FIG. 4 is a schematic of one embodiment of a fuel cell assembly comprising two (2) radiators and three (3) fans per radiator.

Referring to FIGS. 2B, 3B, and 4, components of the thermal management system 120 may be structurally and/or physically configured or connected to the fuel cell system 10 in a frame or brace 132. In other embodiments, components of the thermal management system 120 may not be structurally and/or physically configured or connected to the fuel cell system 10 in a frame or brace 132 at all. In some embodiments, the frame or brace 132 physically houses the thermal management system 120 and/or the fuel cell system 10 in order to provide structural stability and operational protection of the components of those systems.

Referring to FIGS. 2B to 6, in some embodiments, the frame or brace 132 comprises a closed bottom structure 134 that encases the components of the thermal management system 120 for more structural and vibrational stability. In some embodiments, the closed bottom 134 of the frame or brace 132 may separate the thermal management system 120 and its components from the fuel cell system 10 and its components in order to provide more structural stability and operational protection of the components of those systems. The frame or brace 132 may be made of any material known in the art to provide structural stability to a fuel cell system 10, such as metal, steel, stainless steel, or combinations thereof.

Importantly the frame or brace 132 positions, locates and/or connects the one or more radiators 118 to the vehicle or train 100. Specifically, in one embodiment, the radiators 118 are located on the top surface 112 of the train 100. In another embodiment, the radiators 118 are not facing the front 113 of the train 100. In another embodiment, the radiators 118 are located on a top-side surface 38 of the train 100, such that the radiators 118 do not directly encounter and/or benefit from headwinds (see FIG. 2B).

In one embodiment of the present thermal management system 120, as illustrated in FIGS. 4 and 6-8, the radiator 118 may not be placed below or in a lower plane as the fuel cell system 10. Instead, the radiator 118 may be located above or in a higher plane than the fuel cell system 10. For example, as shown in FIGS. 3B-8, the thermal management system 120 comprising the radiator 118 and fans 122 is located on top surface 112 of the vehicle or train 100, while the fuel cell system 10 is located inside the inner region 15 of the train 100, below the radiator 118.

The motor 220 is utilized to power the fans 122 and/or the radiator 118 of the thermal management system 120. In some embodiments, the motor 220 of the thermal management system 120 may be powered by the fuel cell system 10. In some embodiments, a pump 19 may be comprised by the thermal management system 120 to circulate the coolant 36 (e.g., main or secondary fluids) and/or to drive water 36 against gravity to the radiator 118 located above the fuel cell system 10.

As illustrated in FIGS. 3B-8, an exemplary thermal management system 120 may manage the heat 35, air 39, coolant 36, and/or gases produced by the fuel cell system 10 using a radiator 118. Reactants 32, 34 (e.g., fuel and air) and coolants 36 (water, air, and/or fluids) 30 may be put in, flow through, and/or exit or exhaust from the fuel cell system 10. For example, a main fluid (e.g., a coolant) 36 may exit the fuel cell system 10 at a high temperature, remove heat 35 from the fuel cell system 10, and/or reach the radiator 160 while passing through the thermal management system 120.

A coolant 36 of the thermal management system 120 may comprise any material that is capable of removing heat 35 from the fuel cell system 10. The coolant 36 is useful in order to reduce the temperature generated by operation of a fuel cell system 10. Typically, the coolant 36 removes heat 35 from the fuel cell system 10 and transfers it to one or more radiators 118.

In one embodiment, the coolant 36 may be gases (e.g., hydrogen, nitrogen, carbon dioxide, etc.), solids, and/or liquids. In an exemplary embodiment, the coolant 36 may be a liquid, such as water, freon or other heat transferring liquids. The coolant 36 may also be a main fluid 36 of the thermal management system 120, which may further comprise a secondary fluid 37. Cooled coolant 36 exiting the thermal management system 120 may be recirculated back to fuel cell system 10 to absorb more heat 35 in order to cool the fuel cell system 10.

A secondary fluid 37 of the thermal management system 120 may remove heat 35 from the main fluid 36 (e.g., the coolant 36). The secondary fluid 37 of the thermal management system 120 often removes heat 35 from the main fluid 36 (e.g., the coolant) located at the radiator 118 and exhausts the heat 35 to the atmosphere. In one embodiment, an exemplary secondary fluid 37 of the thermal management system 120 may be an oxidant 34, such as air or oxygen. In another embodiment, the secondary fluidic air 37 is atmospheric air or wind that removes heat 35 from the coolant 30 at the radiator 118 and delivers the heat 35 to the atmosphere in order to cool the fuel cell system 10.

In some embodiments, to aid in heat 35 dissipation, the present thermal management system 120 may further comprise one or more fans 122. Fans 122 provide airflow to speed the dissipation of heat 35, air 39, and/or gases from the radiator 118 and fuel cell system 10, respectively and collectively. In other embodiments, a fan 122 may be provided to help dissipate heat 35 away from the radiator 118 of the thermal management system 120. A fan 122 also enables the additional benefit of removing debris from the fuel cell system 10 or the thermal management system 120. Such fans 122 may be rated to supply a desired air speed (e.g., at or about 50 mph) in order to cool the heat 35, air 39, and/or coolant 36 in the thermal management system 120 and fuel cell system 10 of the powertrain or vehicle 100.

As shown in FIG. 4, one or more fans 122 may be located near, next to, or comprised by the radiator 118. In some embodiments, there may be one or more fans 122 configured or connected to each radiator 118. In an illustrative embodiment, about one (1) to about five (5) fans 122 may be associated with each radiator 118, including any number or range of fans comprised therein. In an exemplary embodiment, about three (3) fans 122 may be associated, connected to, and/or configured to dissipate heat 35 from one radiator 118 (see FIG. 4).

In a standard air flow pattern of the thermal management system 120, ambient air 39 may enter the system 120 through an air inlet 131 at the middle corridor of the frame or brace 132. A single fan 122 may direct air flow to the radiator 118 from right to left or in the East-to-West direction. In some embodiments, a single fan 122 may direct air flow to the radiator 118 from left to right or in the West-to-East direction. In some further embodiments, more than one fan 122 may direct air flow to the radiator 118 from both directions.

Figure 5:
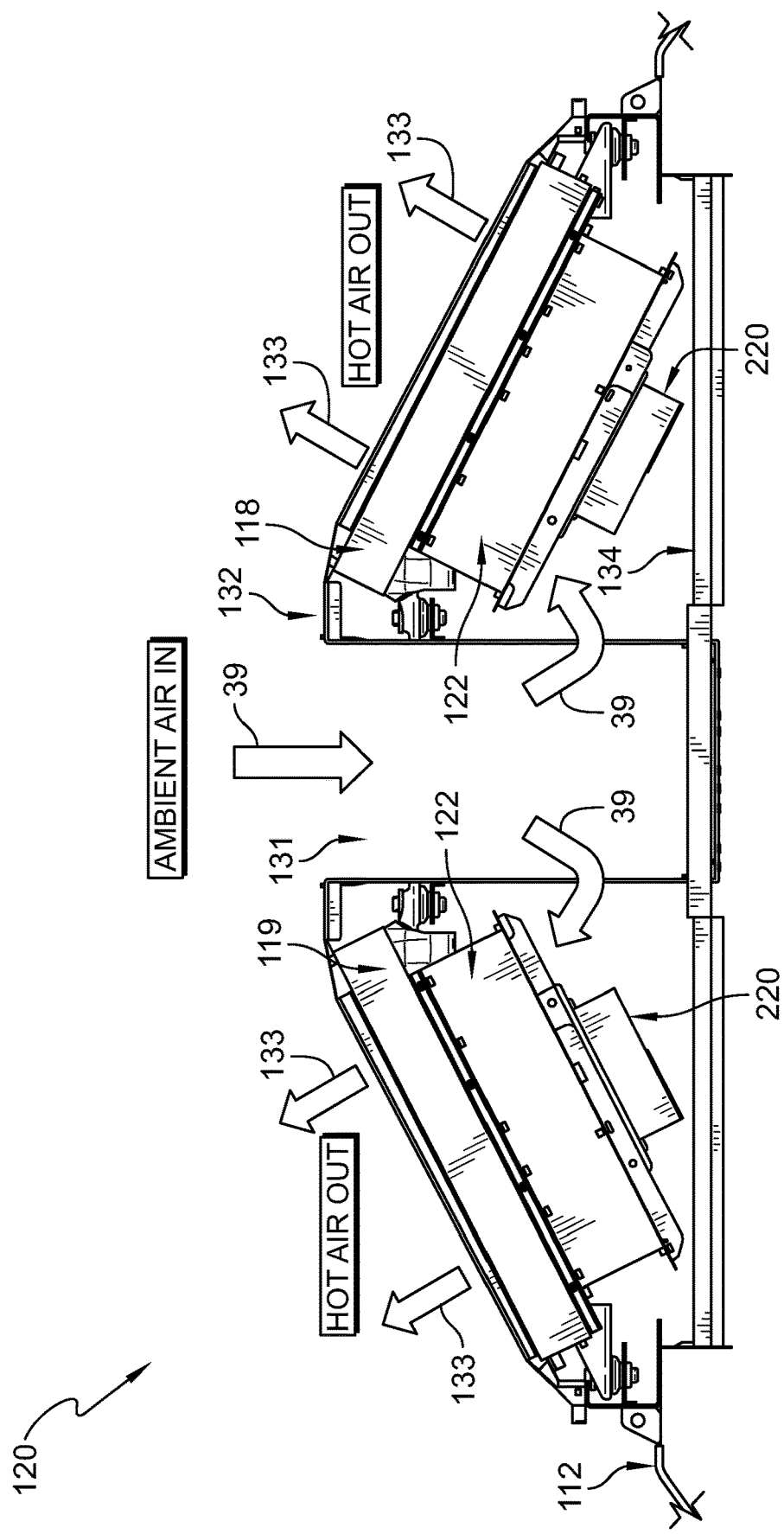
FIG. 5 is a schematic showing standard air flow through a radiator of a fuel cell assembly currently in the art.

FIG. 5 demonstrates a standard air flow pattern of a thermal management system 120 comprising two (2) radiators 118, 119 (e.g., three (3) fans 122 per radiator), such as when a vehicle or train 100 is moving. Ambient air 39 may also enter this system 120 through an air inlet 131 at the middle corridor of the frame or brace 132. However, the fans 122 for the first radiator 118 may direct air flow to the first radiator 118, such as from left to right or in the West-to-East direction. Similarly, the fans 122 for the second radiator 119 may direct air flow to the second radiator 119, such as from right to left or in the East-to-West direction. In some embodiments, the thermal management system 120 may span about 1910 mm along the length of the top surface 112 of the train. In other embodiments, the thermal management system 120 may be longer or shorter than about 1910 mm.

In this standard embodiment, hot air 133 is exhausted or pushed out of the two radiators 118, 119 the fuel cell system 10, and the thermal management system 120 into the environment. Often, when the powertrain or vehicle 100 is moving, the hot air 133 is exhausted into the wind from the radiators 118, 119 located in the middle of the vehicle 100. Air exhaust from the thermal management system 120 is relatively easy when headwinds experienced during movement of the train or vehicle 100 aid in the exhaust and thermal management of the fuel cell system 10.

More specifically, headwinds provide fast moving air that flows through the radiator 118. Typically, headwinds flow from the front-to-back of the radiator 118 and/or in the opposite direction that the vehicle or train 100. Headwinds can significantly aid in the cooling of air and/or coolants via the thermal management system 120 when the vehicle or train 100 is in movement. Headwinds are particularly advantageous when the train 100 is moving at high speeds (e.g., about or greater than 15 to 160 kilometers per hour).

When the vehicle or train 100 is stationary, headwinds are not readily available and do not significantly influence or contribute to thermal management of the fuel cell system 10. In one embodiment, stationary refers to when the wind speed (e.g., headwinds) drops below the exhaust velocity of the thermal management system 120. In one embodiment, when the exhaust velocity from the radiators 118, 119 of the thermal management system 120 drops below about 6 meters/second then the vehicle and/or train 100 is considered to be stationary.

In another embodiment, stationary refers to when a vehicle or train 100 is not moving at all and when the vehicle or train 100 is moving at low or minimal speeds. Low speeds comprise speeds of less than about 15 to about 20 km/hour, including any specific or range of speeds comprised therein, which represents the normal average wind speed on a regular day (e.g., as specified for any geographic area). At low speeds or when a vehicle or train 100 is stationary, there is a significant advantage realized in utilizing the crosswinds that flow perpendicular to the radiators 118, 119 to aid the efficiency and performance of the thermal management system 120.

Accordingly, the present thermal management system 120 and method are directed to cooling air or other coolants when a vehicle or train 100 is stationary. More specifically, the thermal management system 120 and method reverse the direction of the air flow through the radiators 118 of the thermal management system 100. in order to enable continuous cooling operations of the fuel cell system 10 when stationary.

For example in one embodiment, the system 120 and method utilize crosswinds to reverse direction of the air flow through the radiators 118, 119. In another embodiment, the system 120 and method comprise fans 122 to reverse the direction of the air flow through the radiators 118, 119. In yet other embodiments, the system 120 and method comprise crosswinds, fans, and/or any other means to reverse direction of the air flow through the radiators 118, 119.

Figure 6:
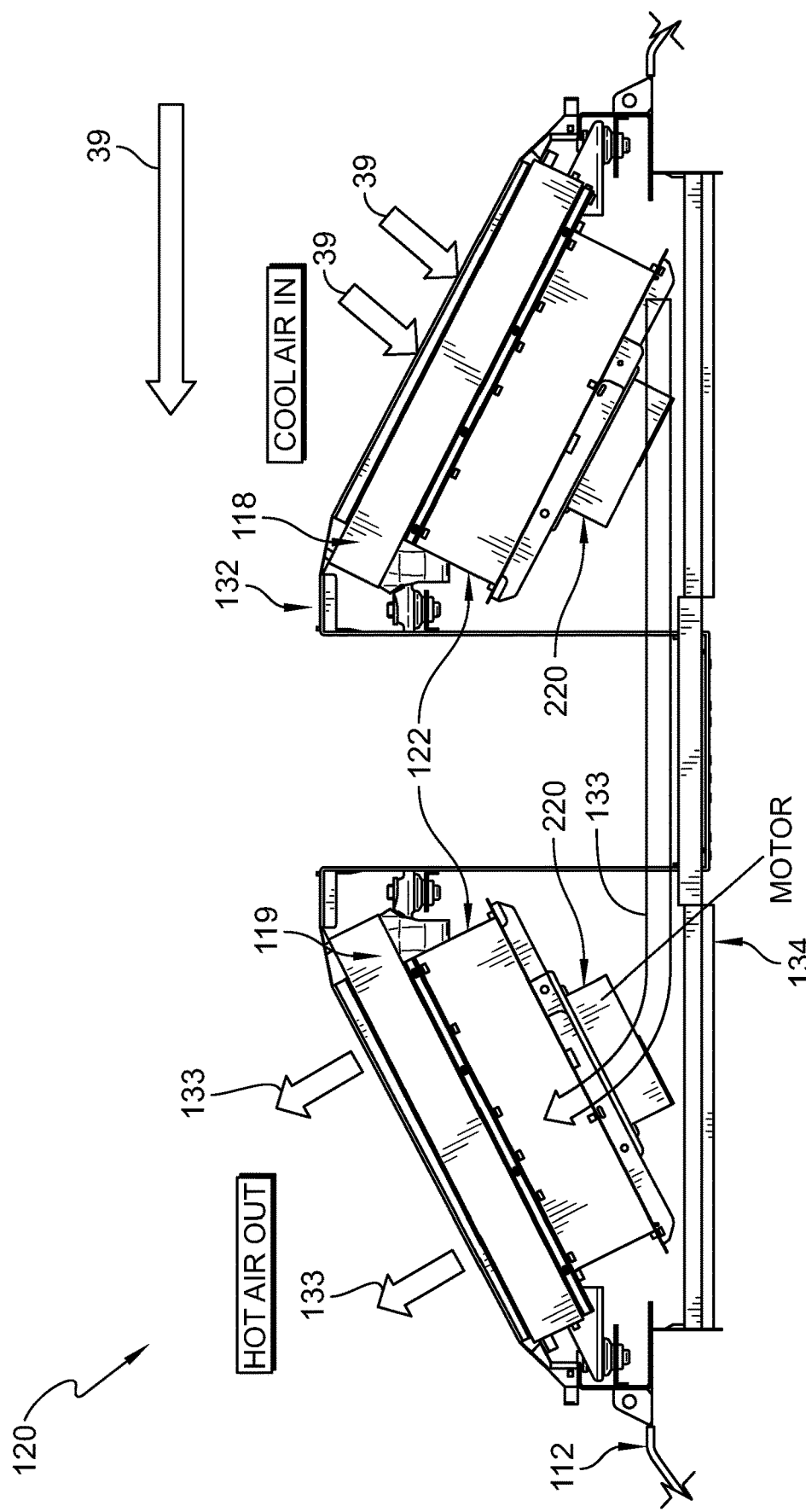
FIG. 6 is a schematic showing one embodiment of adjusted air flow through a radiator of a fuel cell assembly of the present disclosure.

Referring to FIG. 6, the present thermal management system 120 and method utilize crosswinds that typically have speeds greater than the air and/or coolant exhaust velocity of the radiators 118, 119 (e.g., about 6 meters/second). Accordingly, the radiator fans 122 may draw in ambient crosswinds and bolster cooling effects. In particular, the radiator fan 122 direction may be reversed to draw in ambient crosswind air flow that more efficiently cools air in the radiators 118, 119, rather than to blow out hot air.

Figure 7:
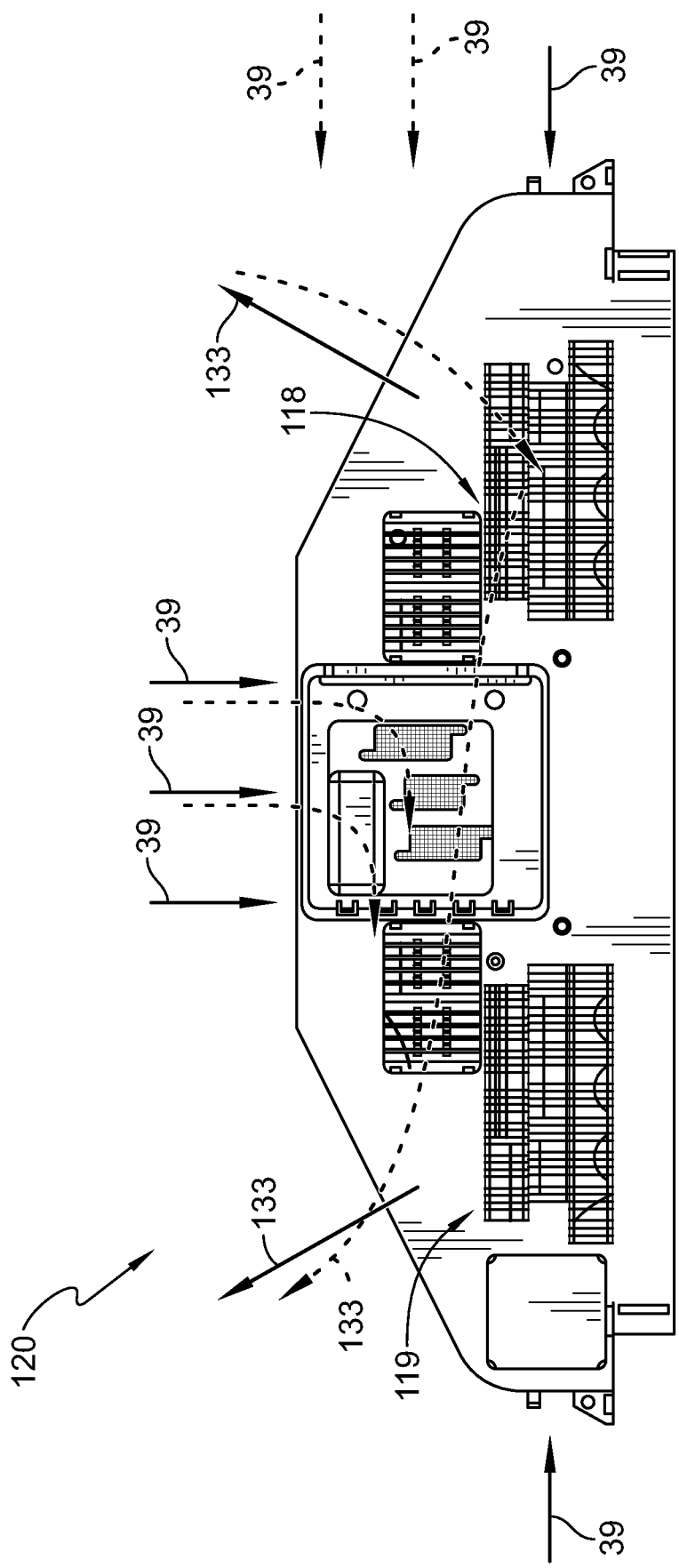
FIG. 7 is a schematic showing a second embodiment of adjusted air flow through a cooling system of a radiator located at a driver's cab end of a vehicle

In one embodiment shown in FIGS. 6 and 7, the direction of a fan 122 of a first radiator 118 has been reversed. More specifically, the direction of the fan of the first radiator 118 has been changed or switched to intake or draw in air rather than push out air. In particular, the fan 122 of the first radiator 118 of FIG. 6 utilizes crosswind air that may flow (as indicated by the arrows) in the East-to-West direction, such as from the atmosphere into a first radiator 118 of the thermal management system 120. The air flow of the reversed fan 122 of the first radiator 118 may continue across and/or through the second radiator 119 to the environment since the direction of the fan 122 of the second radiator 119 remains unchanged. In a separate embodiment, air may also flow in the opposite direction that is shown in FIG. 6, such as in the West-to-East direction, into the second radiator 119, and out of the first radiator 118.

In yet a further embodiment of the thermal management system 120 shown in FIGS. 5 to 7, the direction of both fans 122, such as of the first radiator 118 and the second radiator 119, may be reversed. More specifically, the direction of the fan 122 of the first radiator 118 may be changed or switched to intake or draw in air and push out air in the East-to-West direction rather than the West-to-East direction shown in FIG. 5. In addition, the direction of the fan 122 of the second radiator 119 may be changed or switched to intake or draw in air and push out air in the West-to-East direction rather than the East-to-West direction shown in FIG. 5. In addition, the fans 122 of the first 118 and second radiators 119 may utilize crosswind air that may flow counter to the direction indicated by the arrows in FIG. 5.

FIG. 7 demonstrates an embodiment of the present thermal management system 120 when located at the driver's end of a vehicle or train 100. Similar to FIG. 5, the solid arrows of FIG. 7 indicate the standard flow of air or coolant of a vehicle or train 100. The dashed arrows indicate the reversed air or coolant flow of the vehicle or train 100 using the present thermal management system 120 comprising air flow in the East-to-West direction into a first radiator 118 and out of a second radiator 119.

Figure 8:
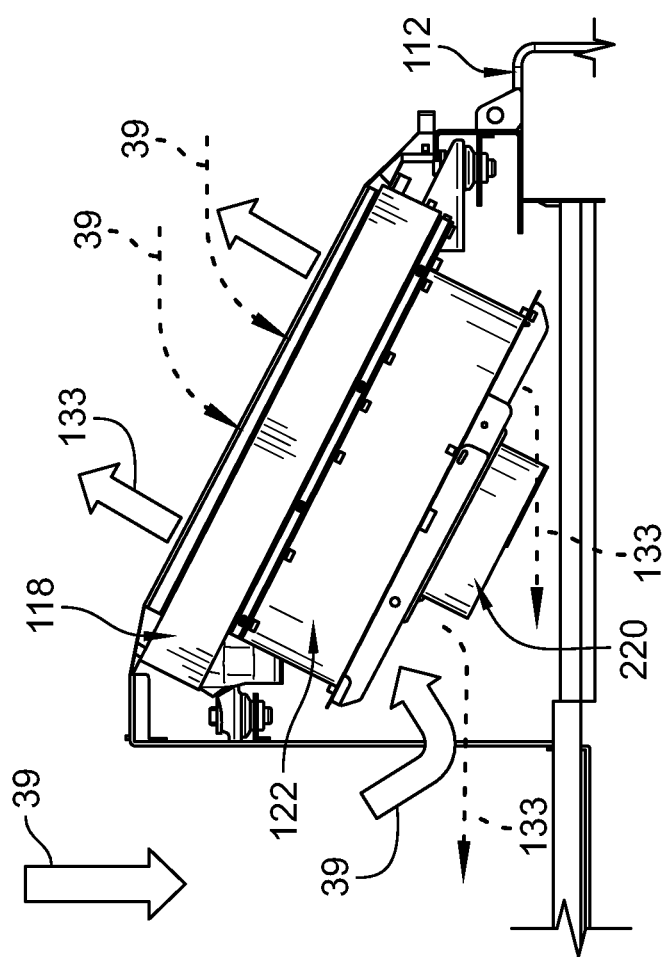
FIG. 8 is a schematic showing a third embodiment of adjusted air flow through a single radiator of a fuel cell assembly of the present disclosure.

FIG. 8 demonstrates one embodiment of the present thermal management system 120 when the radiator 118 comprises only one fan 122. In such an embodiment, the direction of the single fan 122 of the radiator 118 may be reversed. More specifically, the direction of the fan 122 of the radiator 118 may be changed or switched to draw in crosswind air that may flow (as indicated by the dashed arrows) in the East-to-West direction, such as from the atmosphere into the radiator 118, across and/or through the other side to the environment (e.g., through a mesh). In another embodiment, the single fan 122 may push air flow in the opposite direction that is shown in FIG. 7, such as in the West-to-East direction, into the bottom, and out of the top of the single radiator 118.

In one embodiment, the present vehicle or train 100, including its thermal management system 120 and/or the fuel cell system 10, comprise one or more sensors (not shown). In one embodiment, sensors may detect operational or functional parameter of the fuel cell system 10 (e.g., the radiator 118 and/or coolant system 400) and when those parameters drift outside of proper or manufacturer operating specifications. In one embodiment, sensors may comprise air, wind, sensors, and/or temperature sensors. In one embodiment, the one or more sensors may be connected, attached, mounted on, and/or configured to communicate with the thermal management system 120 (e.g., the radiators 118 and the fans 122) and/or the fuel cell system 10 (e.g. the fuel cells 20).

In one embodiment, sensors communicate with radiator fans 122 to turn on, turn off, turn in one direction, turn in a different direction, slow down, speed up, etc. Sensors communicate with radiator fans in the thermal management system 120 in order to maintain the fuel cell operating temperature and air flow within an acceptable operating threshold.

In some embodiments, the method steps of reversing the direction of air flow, including 1) detecting the coolant flow or temperature with a sensor, 2) utilizing environmental crosswinds, and 3) reversing the direction of the radiator fans 122, may be performed manually, automatically, electronically, by a person, by a robot, by an instrument or using equipment. In an illustrative embodiment, the method may be performed manually by a human, such as a train operator, service technician, and/or conductor. In another embodiment, the method may be performed electronically and/or automatically by a robot, a machine, or a computer.

Figure 9:
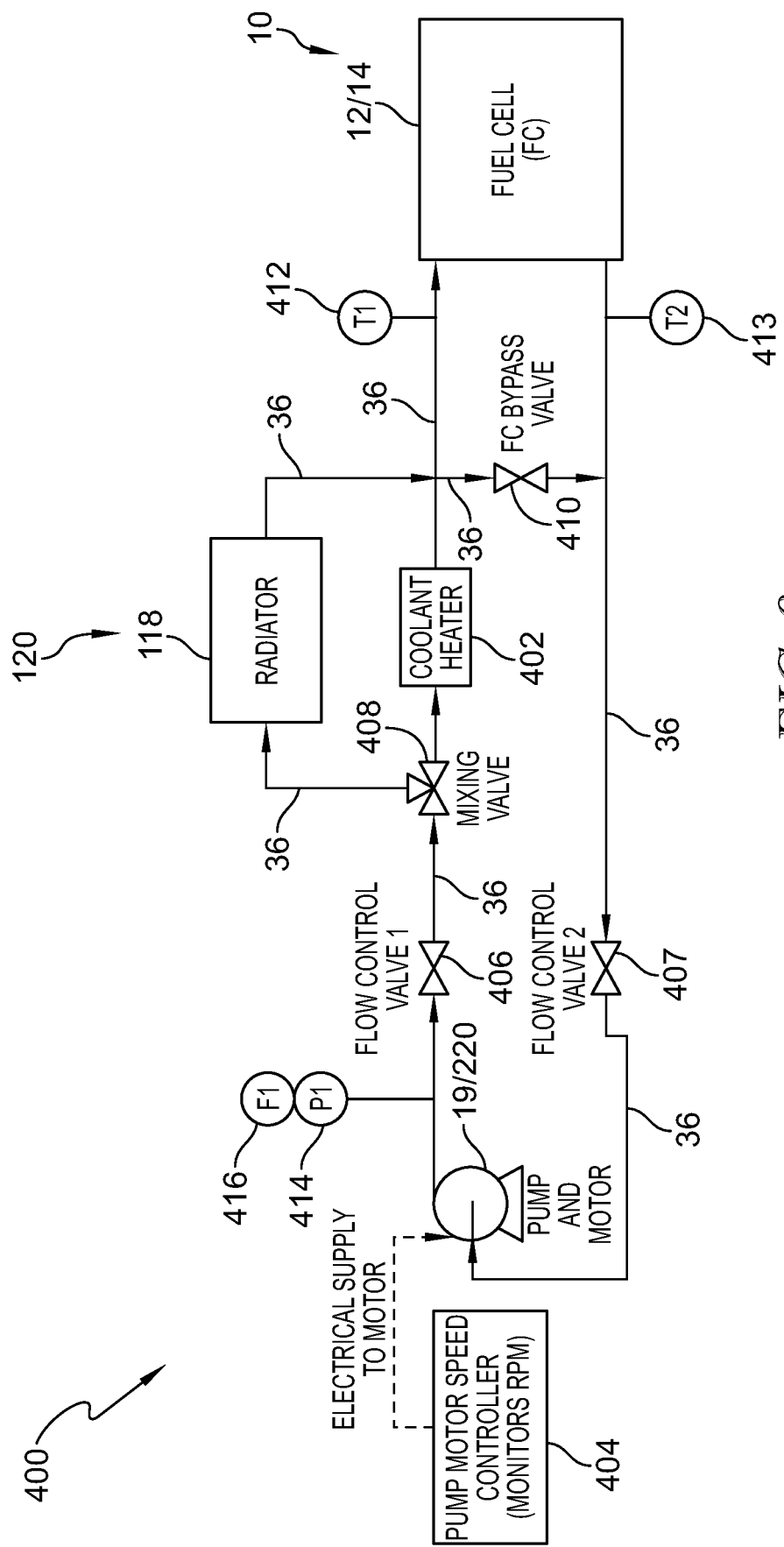
FIG. 9 is a schematic showing another embodiment of the thermal management system having a cooling system connected to a fuel cell system of a vehicle.

Alternatively or additionally, as shown in FIG. 9, the thermal management system 120 includes an air handling system, which is the thermal management system 120 as described above, and further includes a cooling system 400. The cooling system 400 thermally manages the fuel cell system 10 with coolant 36 and comprises, is configured to be connected to, or configured to communicate with one or more fuel cell systems 10, one or more radiators 118, a pump 19, a motor 220, a coolant heater 402, and a pump motor speed controller 404, either individually or in combination with each other. The disclosures of the air handling system 120 (thermal management system 120), fuel cell system 10, the coolant 36, the radiator 118, the pump 19, and the motor 220 are incorporated by reference for the cooling system 400 except for the differences explicitly described below.

In the illustrative embodiment, the cooling system 400 is connected to the radiator 118 of the air handling system 120 as well as the fuel cell system 10. The cooling system 400 includes the pump 19, the motor 220, the coolant heater 402, and the pump motor speed controller 404. In some embodiments, the cooling system 400 may include more than one pump 19, more than one motor 220, more than one coolant heater 402, and/or more than one pump motor speed controller 404. In some embodiments, the pump motor speed controller 404 may be electrically connected to the air handling system 120 and/or the vehicle or train 100.

The pump 19, controlled by the motor 220, drives the coolant 36 through the cooling system 400 and the fuel cell system 10. The coolant 36 may be a liquid, such as water, freon or other heat transferring liquids. The pump motor speed controller 404 is electrically coupled to the motor 220 and adjusts the speed of motor 220 to manipulate a flow rate of the coolant 36. In some embodiments, the speed of the motor 220 may range from about 2500 revolutions per minute (RPM) to about 3000 RPM. The speed of the motor 220 may be less than about 2500 RPM and/or greater than about 3000 RPM. For example, at or shortly after the beginning of life of one or more fuel cell stacks 12 and/or fuel cell modules 14 of the fuel cell system 10, the speed of the motor 220 may be less than about 3000 RPM, then increased to 3000 RPM, and then slowed down to about 2500 RPM. As the one or more fuel cell stacks 12 and/or fuel cell modules 14 age, the speed of the motor 220 may increase from about 2500 RPM to manipulate the flow rate of the coolant 36 to compensate for reduced efficiency of the one or more fuel cell stacks 12 and/or fuel cell modules 14 of the fuel cell system 10. The flow rate of the coolant 36 is inferred from the speed of the motor 220 and/or the pump 19, and may also be measured with a coolant flow sensor 416.

Manipulating the flow rate of the coolant 36 maintains an operating temperature of the fuel cell system 10. In some embodiments, the operating temperature of the fuel cell system 10 may range from about 65° C. to about 67° C. The operating temperature of the fuel cell system 10 may be less than about 65° C. and/or greater than about 67° C. depending on the type of fuel cells 20 of the fuel cell system 10.

The cooling system 400 also includes one or more valves and one or more sensors to control and monitor the temperature and flow rate of the coolant 36. The one or more valves include a first flow control valve 406, a second flow control valve 407, a mixing valve 408, and a bypass valve 410. The one or more sensors include a first temperature sensor 412, a second temperature sensor 413, a coolant pressure sensor 414, and/or a coolant flow sensor 416.

In some embodiments, the cooling system 400 may have more or less valves and/or sensors than described above. The one or more sensors and the one or more valves are electrically coupled to the pump motor speed controller 404. In some embodiments, the one or more sensors and the one or more valves may be electrically coupled to the air handling system 120 and/or the vehicle or train 100.

In the illustrative embodiment, the coolant 36 flows from the pump 19 through the first flow control valve 406. The coolant pressure sensor 414 and the coolant flow temperature 416 are positioned between the pump 19 and the first flow control valve 406 to detect the pressure and flow of the coolant 36 leaving the pump 19. The coolant 36 then flows to the mixing valve 408, where the mixing valve 408 disperses the coolant 36 to the one or more radiators 118 and the coolant heater 402. The coolant heater 402 heats the coolant 36, while the one or more radiators 118 cool the coolant 36.

Depending on whether the one or more fuel cell stacks 12 and/or fuel cell modules 14 need to be heated or cooled, the heated coolant 36 may flow through the bypass valve 410 and/or to the one or more fuel cell stacks 12 and/or fuel cell modules 14. Likewise, the cooled coolant 36 may flow through the bypass valve 410 and/or to the one or more fuel cell stacks 12 and/or fuel cell modules 14.

The first temperature sensor 412 monitors and detects the temperature of the coolant 36 entering the one or more fuel cell stacks 12 and/or fuel cell modules 14. The second temperature sensor 413 monitors and detects the temperature of the coolant 36 exiting the one or more fuel cell stacks 12 and/or fuel cell modules 14. As the coolant 36 flows from the one or more fuel cell stacks 12 and/or fuel cell modules 14 through the second flow control valve 407 towards the pump 19, the pump motor speed controller 404 calculates the difference between the temperature of the coolant detected by the first temperature sensor 412 and by the second temperature sensor 413. The pump motor speed controller 404 then increases, decreases, or maintains the speed of the motor 220 to increase, decrease, or maintain the flow rate of the coolant 36 as it exits the pump 19. In some embodiments, the one or more valves and the one or more sensors may be positioned anywhere along the coolant 36 flow path.

Figure 10:
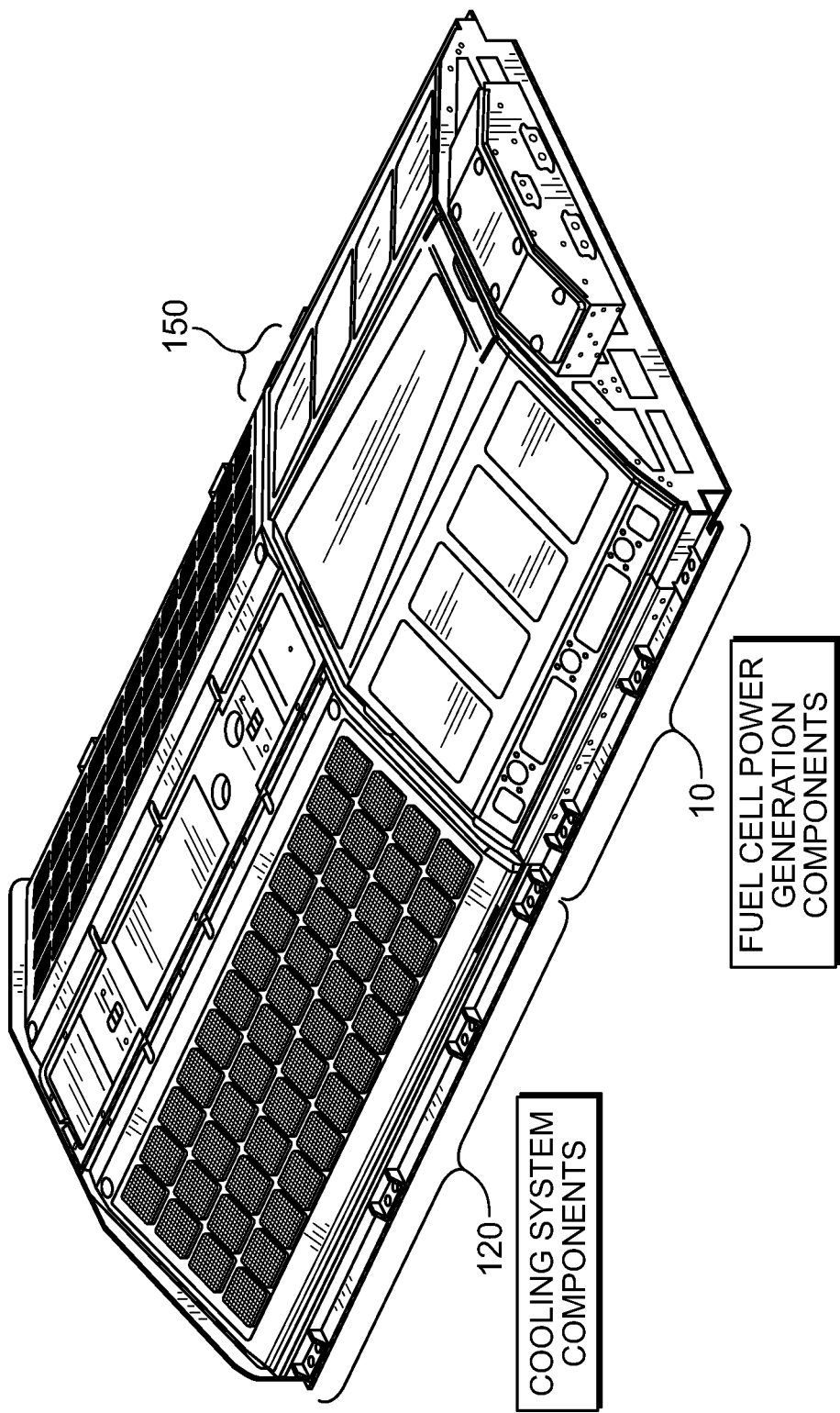
FIG. 10 is a schematic showing another embodiment of a fuel cell assembly of the present disclosure with the cooling system components distinctly separated from the fuel cell system components.

Finally, FIG. 10 demonstrates a side-by-side positioning layout of the thermal management system 120 comprising the radiator 118 and fans 122 that is located on the same surface and/or in the same plane as the fuel cell system 10. For example, the thermal management system 120 comprising the radiator 118 and fans 122 is located on the same top surface 112 of the vehicle or train 100, while the fuel cell system 10 is also located on the same top surface 112 of the vehicle or train 100.

In other such embodiments, the radiator 118 of the thermal management system 120 and the fuel cell system 10 may be positioned or located on the same plane and in any position or location that provides operational efficiency, assessment, maintenance, and/or repair of the fuel cells 20. Notably, FIG. 10 demonstrates an advantageous side-by-side system layout embodiment.

In one such embodiment, the fuel cell power generating components of the fuel cell system 10 are distinctly and separately located adjacent to the main cooling system 400/120 components of the thermal management system 120. This specific side-by-side layout design comprising the thermal management system 120 located adjacent to and separately from the fuel cell system 10 provides some benefits over other layout embodiments described herein (e.g., FIGS. 3B-8).

Importantly, the side-by-side layout demonstrated in FIG. 10 allows that the fuel cells 20 are more easily accessible for servicing without significant disturbance to the cooling 400/120 and other sub-systems of the thermal management system 120. This layout side-by-side of FIG. 10 also facilitates redesign, resizing, and/or repositioning of one or both of the thermal management (e.g., cooling) system 120 and the fuel cells 20 of the fuel cell system 10, which can be increased or decreased independently of each other, if required. This additional flexibility of the side-by-side positioning of the fuel cell system 10 and thermal management system 120 significantly reduces the time and number of components that would need to be redesigned in any new system.

Additionally, the improved efficiency and effectiveness provided by the side-by-side design of the of the fuel cell system 10 and thermal management system 120 lies in that the fuel cells 20 remain separated from the cooling system 400/120. In some embodiments, the fuel cell system 10 and thermal management system 120 are separated by a distinct, uniform, or non-uniformly shaped separation distance 150 that ranges from about 0.5 inch to about 12 inches in width, including any and all specific or range of distances comprised therein. In some embodiments, the separation distance 150 is uniformly shaped, such as in a straight line, that has a separation distance or thickness 150 ranging from about 0.5 inch to about 12 inches thick, including all specific or range of thickness 150 comprised therein.

In another embodiment, the separation distance 150 between the fuel cell system 10 and thermal management system 120 may ranges from about 0.5 to about 12 inches long, including all specific or range of distances comprised therein. Side-by-side and distinct separation of the fuel cells of the fuel cell system 10 from the radiators 118 and other components of the thermal management system 120 enable easy accessibility to the fuel cells 20 or fuel cell system 10 components for servicing. The side-by-side positioning of the fuel cell system 10 and thermal management system 120 also minimizes or reduces the amount or need for disassembly of other components and disturbing significant parts of other subsystems in order to reach the fuel cells 20 of the fuel cell system 10.

For example, the present side-by-side layout of the fuel cell system 10 and the thermal management system 120 may be and/or is an improvement over the layouts described in FIGS. 3B-8. Illustratively, the side-by-side layout of the fuel cell system 10 and the thermal management system 120 is advantageous over alternative layouts, wherein the radiators 118 may be located or positioned over top, atop, or on top of the fuel cell systems 10, thereby requiring that the cooling or thermal management system 120 be moved or removed before the fuel cell system 10 components are accessible for assessment, maintenance, and/or repair. Therefore, the present side-by-side layout of the fuel cell system 10 and the thermal management system 120, as shown in FIG. 10, also facilitates the design of other iterations of the present invention as the fuel cell 10 and cooling systems 400/120 can be increased or decreased in scope and size, independently.

For example, if more cooling is needed because the presently claimed system and methods are going to be deployed in a part of the world having hot, ambient temperature, the side-by-side positioning of the present fuel cell system 10 and thermal management system 120 would easily allow or enable expansion of the cooling system 400/120 on its distinct side to include longer or larger radiators 118. In turn, expanding or enlarging the radiators 118 to allow for the required cooling in hot temperatures would be conducted without affecting the components of the fuel cell system 10 on its side. The independent ability to access the fuel cell system 10 and the thermal management system or cooling system 400/120 separately and independently also thereby advantageously minimizes any redesign efforts and increasing cooling and thermal management efficiency.

The following described aspects of the present invention are contemplated and non-limiting:

A first aspect of the present invention relates to a method of operating a thermal management system in a vehicle. The method includes the steps of operating a radiator, one or more fans, and a fuel cell system, slowing or stopping movement of the vehicle to a stationary position, reversing the direction of the one or more fans, drawings crosswinds into the radiator in an opposite direction, and continuing operation of the radiator and the fuel cell system during the stationary position. The radiator and the one or more fans are located on the top surface of the vehicle.

A second aspect of the present invention relates to a thermal management system for optimally cooling air in a stationary vehicle. The system includes one or more adjusted fans, one or more radiators comprising crosswinds, and a frame. The adjusted fan directs air into one or more radiators in a direction opposite a normal fan. The frame positions the one or more radiators on the top-side of the stationary vehicle. The system may be an apparatus or embodied within an apparatus.

A third aspect of the present invention relates to a method of exhausting air of a thermal management system on a stationary train. The method includes the steps of operating at least two radiators, at least two fans, and a fuel cell system, slowing or stopping movement of the stationary train to a stationary position that comprises a speed that is about or less than 20 km/hour, drawing air flow and crosswinds into at least one of the at least two radiators in an opposite direction of a normal fan, propelling the air flow and the crosswinds through at least one of the at least two radiators, and exhausting air out of at least one of the at least two radiators and the fuel cell system while the stationary train is in the stationary position.

A fourth aspect of the present invention relates to thermally managing and operating a fuel cell system in a vehicle with a cooling system. The method includes the steps of determining a change in temperature of a coolant between an inlet and an outlet of the fuel cell system, comparing the change in temperature of the coolant to a predetermined target coolant temperature, adjusting a speed of a motor of the cooling system to change a flow rate of the coolant, and driving the coolant with an adjusted flow rate through a cooling system to maintain an operating temperature of the fuel cell system. The motor is coupled to a pump of the cooling system.

A fifth aspect of the present invention relates to a cooling system for thermally managing a fuel cell system in a vehicle. The system includes a pump, a motor coupled to the pump, and a pump motor speed controller. The pump drives a coolant through the cooling system and the fuel cell system coupled to the cooling system. The pump motor speed controller is electrically coupled to the motor to drive the pump and adjusts the speed of the motor to manipulate a flow rate of the coolant and maintain an operating temperature of the fuel cell system. The system may be an apparatus or embodied within an apparatus.

In the first aspect of the present invention, drawing crosswinds into the radiator in an opposite direction may include drawing ambient air into the radiator first and then through the one or more fans second. In the first aspect of the present invention, drawing crosswinds into the radiator in an opposite direction may include drawing ambient air into the one or more fans first and then through the radiator second.

In the first aspect of the present invention, the step of operating may further include operating a second radiator, the second radiator being coupled to one or more fans. In the first aspect of the present invention, drawing crosswinds into the radiator in an opposite direction may include drawing ambient air into the radiator first, through the one or more fans second, through the one or more fans coupled to the second radiator third, and through the second radiator last.

In the first and second aspect of the present invention, the vehicle or stationary vehicle may be a train.

In the first and third aspect of the present invention, the radiator and/or the at least two radiators, the one or more fans and/or the at least two fans, and the fuel cell system may be located in a frame.

In the first, second, and third aspect of the present invention, the stationary position may include or the stationary vehicle may travel at a vehicle speed that is at, about, or lower than about 15 km/hour and/or 20 km/hour.

In the first, second, and third aspect of the present invention, the radiator and/or one or more radiators and/or at least two radiators, the one or more fans and/or the one or more adjusted fans and/or the at least two fans, and the fuel cell system may be located on the top surface and/or top-side of the vehicle and/or stationary vehicle and/or stationary train. In the first, second, and third aspect of the present invention, the radiator and/or one or more radiators and/or at least two radiators, the one or more fans and/or the one or more adjusted fans and/or the at least two fans, and the fuel cell system may be separately located on the top surface and/or top-side of the vehicle and/or stationary vehicle and/or stationary train. In the first, second, and third aspect of the present invention, the radiator and/or one or more radiators and/or at least two radiators, the one or more fans and/or the one or more adjusted fans and/or the at least two fans may be positioned adjacent to the fuel cell system by at least 0.5 inches of a separation distance. In the first, second, and third aspect of the present invention, the separation distance may range from about 0.5 inches to about 12 inches.

In the fourth aspect of the present invention, determining the change in temperature may include detecting the temperature of the coolant or calculating the change in temperature of the coolant. In the fourth aspect of the present invention, detecting the temperature of the coolant may include measuring the temperature of the coolant at the inlet of the fuel cell system with a first temperature sensor or measuring the temperature of the coolant at the outlet of the fuel cell system with a second temperature sensor.

In the fourth aspect of the present invention, the method may further include the step of detecting a pressure of the coolant. In the fourth aspect of the present invention, detecting the pressure of the coolant may include detecting the pressure of the coolant at an inlet of the pump or an outlet of the pump with a pressure sensor.

In the fourth aspect of the present invention, the method may further include the step of variably manipulating the adjusted flow rate or the temperature of the coolant through the cooling system.

In the fourth and fifth aspect of the present invention, the speed of the motor may be adjusted to and/or the pump motor speed controller may adjust the speed of the motor to at least about 2,500 RPM. In the fourth and fifth aspect of the present invention, the speed of the motor may be adjusted to and/or the pump motor speed controller may adjust the speed of the motor to between about 2,500 RPM and about 3,000 RPM.

In the fifth aspect of the present invention, the cooling system may further include a first temperature sensor to detect the temperature of the coolant at an inlet of the fuel cell system and a second temperature sensor to detect the temperature of the coolant at an outlet of the fuel cell system. In the fifth aspect of the present invention, the pump motor speed controller may be electrically coupled to both the first temperature sensor and the second temperature sensor to monitor a change in temperature between the coolant at the inlet of the fuel cell system and at the outlet of the fuel cell system. In the fifth aspect of the present invention, the cooling system may further include a coolant pressure sensor to detect the pressure of the coolant at an outlet and/or at an inlet of the pump.

In the fifth aspect of the present invention, an adjusted flow rate of the coolant through the cooling system may be configured to maintain the operating temperature of the fuel cell system.

The features illustrated or described in connection with one exemplary embodiment may be combined with any other feature or element of any other embodiment described herein. Such modifications and variations are intended to be included within the scope of the present disclosure. Further, a person skilled in the art will recognize that terms commonly known to those skilled in the art may be used interchangeably herein.

The above embodiments are described in sufficient detail to enable those skilled in the art to practice what is claimed and it is to be understood that logical, mechanical, and electrical changes may be made without departing from the spirit and scope of the claims. The detailed description is, therefore, not to be taken in a limiting sense.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Specified numerical ranges of units, measurements, and/or values include, consist essentially or, or consist of all the numerical values, units, measurements, and/or ranges including or within those ranges and/or endpoints, whether those numerical values, units, measurements, and/or ranges are explicitly specified in the present disclosure or not.

Unless defined otherwise, technical and scientific terms used herein have the same meaning as is commonly understood by one of ordinary skill in the art to which this disclosure belongs. The terms "first", "second", "third", and the like, as used herein do not denote any order or importance, but rather are used to distinguish one element from another. The term "or" and "and/or" is meant to be inclusive and mean either, all, or any combination of the listed items. In addition, the terms "connected" and "coupled" are not restricted to physical or mechanical connections or couplings, and can include electrical connections or couplings, whether direct or indirect. Direct connection and/or coupling can include such connections and/or couplings where no intermittent connection or component is present between two endpoints, components or items. Indirect connection and/or coupling can include where there is one or more intermittent or intervening connections and/or couplings present between respective endpoints, components or items.

Moreover, unless explicitly stated to the contrary, embodiments "comprising", "including", or "having" an element or a plurality of elements having a particular property may include additional such elements not having that property. The term "comprising" or "comprises" refers to a composition, compound, formulation, or method that is inclusive and does not exclude additional elements, components, and/or method steps. The term "comprising" also refers to a composition, compound, formulation, or method embodiment of the present disclosure that is inclusive and does not exclude additional elements, components, or method steps. The phrase "consisting of" or "consists of" refers to a compound, composition, formulation, or method that excludes the presence of any additional elements, components, or method steps.

The term "consisting of" also refers to a compound, composition, formulation, or method of the present disclosure that excludes the presence of any additional elements, components, or method steps. The phrase "consisting essentially of" or "consists essentially of" refers to a composition, compound, formulation, or method that is inclusive of additional elements, components, or method steps that do not materially affect the characteristic(s) of the composition, compound, formulation, or method. The phrase "consisting essentially of" also refers to a composition, compound, formulation, or method of the present disclosure that is inclusive of additional elements, components, or method steps that do not materially affect the characteristic(s) of the composition, compound, formulation, or method steps.

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. In some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

It is to be understood that the above description is intended to be illustrative, and not restrictive. For example, the above-described embodiments (and/or aspects thereof) may be used individually, together, or in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method of operating a thermal management system in a vehicle, the method comprising the steps of:
 operating a radiator and a second radiator, one or more fans, and a fuel cell system, wherein the radiator and the one or more fans are located on the top surface of the vehicle and the second radiator is coupled to one or more additional fans,
 slowing or stopping movement of the vehicle to a stationary position, wherein the stationary position comprises a vehicle speed that is at, about, or lower than about 20 km/hour,
 reversing the direction of the one or more fans,
 drawing crosswinds into the radiator in an opposite direction comprising drawing ambient air into the radiator first, through the one or more fans second, through the one or more additional fans coupled to the second radiator third, and through the second radiator last, and continuing operation of the radiator and the fuel cell system during the stationary position.

2. The method of claim 1, wherein the radiator, the one or more fans, and the fuel cell system are located in a frame.

3. The method of claim 1, wherein the stationary position comprises a vehicle speed that is at, about, or lower than about 15 km/hour.

4. The method of claim 1, wherein the fuel cell system is located on the top surface of the vehicle.

5. The method of claim 4, wherein the radiator, the second radiator, the one or more fans, and the fuel cell system are separately located on the top surface of the vehicle.

6. The method of claim 5, wherein the radiator, the second radiator, and the one or more fans are positioned adjacent to the fuel cell system by at least 0.5 inches of a separation distance.

7. The method of claim 6, wherein the separation distance ranges from about 0.5 inches to about 12 inches.

8. The method of claim 7, wherein the separation distance is uniformly shaped in a straight line.

9. A method of exhausting air of a thermal management system on a stationary train, the method comprising the steps of:
   operating at least two radiators, at least two fans, and a fuel cell system, wherein the at least two radiators comprise a first radiator and second radiator, and wherein the at least two fans comprise a first fan and a second fan, the second fan being coupled to the second radiator and the first fan being coupled to the first radiator,
   slowing or stopping movement of the stationary train to a stationary position that comprises a speed that is about or less than 20 km/hour,
   drawing air flow and crosswinds into the first radiator in an opposite direction of a normal fan by drawing air flow first through the first radiator and then through the first fan,
   propelling the air flow and the crosswinds through the first radiator and then through the first fan, and
   exhausting air out of the second fan and then the second radiator while the stationary train is in the stationary position.

10. The method of claim 9, wherein the at least two radiators, the at least two fans, and the fuel cell system are located in a frame.

11. The method of claim 10, wherein the at least two radiators, the at least two fans, and the fuel cell system are located on the top surface of the stationary train.

12. The method of claim 10, wherein the stationary position comprises a speed that is at, about, or lower than about 15 km/hour.

13. The method of claim 10, wherein the at least two radiators, the at least two fans, and the fuel cell system are separately located on the top surface of the stationary train.

14. The method of claim 13, wherein the at least two radiators and the at least two fans are positioned adjacent to the fuel cell system by at least 0.5 inches of a separation distance.

15. The method of claim 14, wherein the separation distance ranges from about 0.5 inches to about 12 inches.

16. A thermal management system for optimally cooling air in a stationary vehicle, the system comprising:
   one or more adjusted fans, wherein the adjusted fan directs air into one or more radiators in a direction opposite of a normal fan by drawing air into the one or more radiators first, through the one or more adjusted fans second, through a different one or more adjusted fans third, and out of a different one or more radiators last,
   one or more radiators comprising crosswinds, and
   a frame, wherein the frame positions the one or more radiators on the top-side of the stationary vehicle.

17. The system of claim 16, wherein the stationary vehicle travels at a speed that is at, about, or lower than about 15 km/hour.

18. The system of claim 16, wherein the one or more radiators, the one or more adjusted fans, and the fuel cell system are separately located on the top surface of the stationary vehicle.

19. The system of claim 18, wherein the one or more radiators and the one or more adjusted fans are positioned adjacent to the fuel cell system by at least 0.5 inch of a separation distance.

20. The system of claim 19, wherein the separation distance ranges from about 0.5 inches to about 12 inches.

* * * * *